United States Patent [19]

Ishida et al.

[11] 4,016,256

[45] Apr. 5, 1977

[54] ANTIBIOTIC TS-0822

[75] Inventors: Nakao Ishida; Fumio Kitame, both of Sendai; Kuniko Utsushikawa, Nagoya; Tomoaki Kohama; Takuya Saito, both of Sendai; Mikio Kikuchi, Osaka, all of Japan

[73] Assignee: Kayaku Antibiotic Research Co., Ltd., Japan

[22] Filed: Nov. 19, 1975

[21] Appl. No.: 633,475

[52] U.S. Cl. .............................. 424/121; 195/80 R
[51] Int. Cl.² ........................................ A61K 35/74
[58] Field of Search ................... 424/121; 195/80 R

[56] References Cited

UNITED STATES PATENTS 3,839,559  10/1974  Hamill et al. ...................... 424/121

*Primary Examiner*—Jerome D. Goldberg
*Attorney, Agent, or Firm*—Hill, Gross, Simpson, Van Santen, Steadman, Chiara & Simpson

[57] ABSTRACT

A prophylactic and therapeutic composition effective in the treatment of coccidiomycosis and including a new antibiotic known as TS-0822.

11 Claims, 4 Drawing Figures

Ultraviolet spectrum of antibiotic in ethanol

Ultraviolet spectrum of sodium salt in ethanol

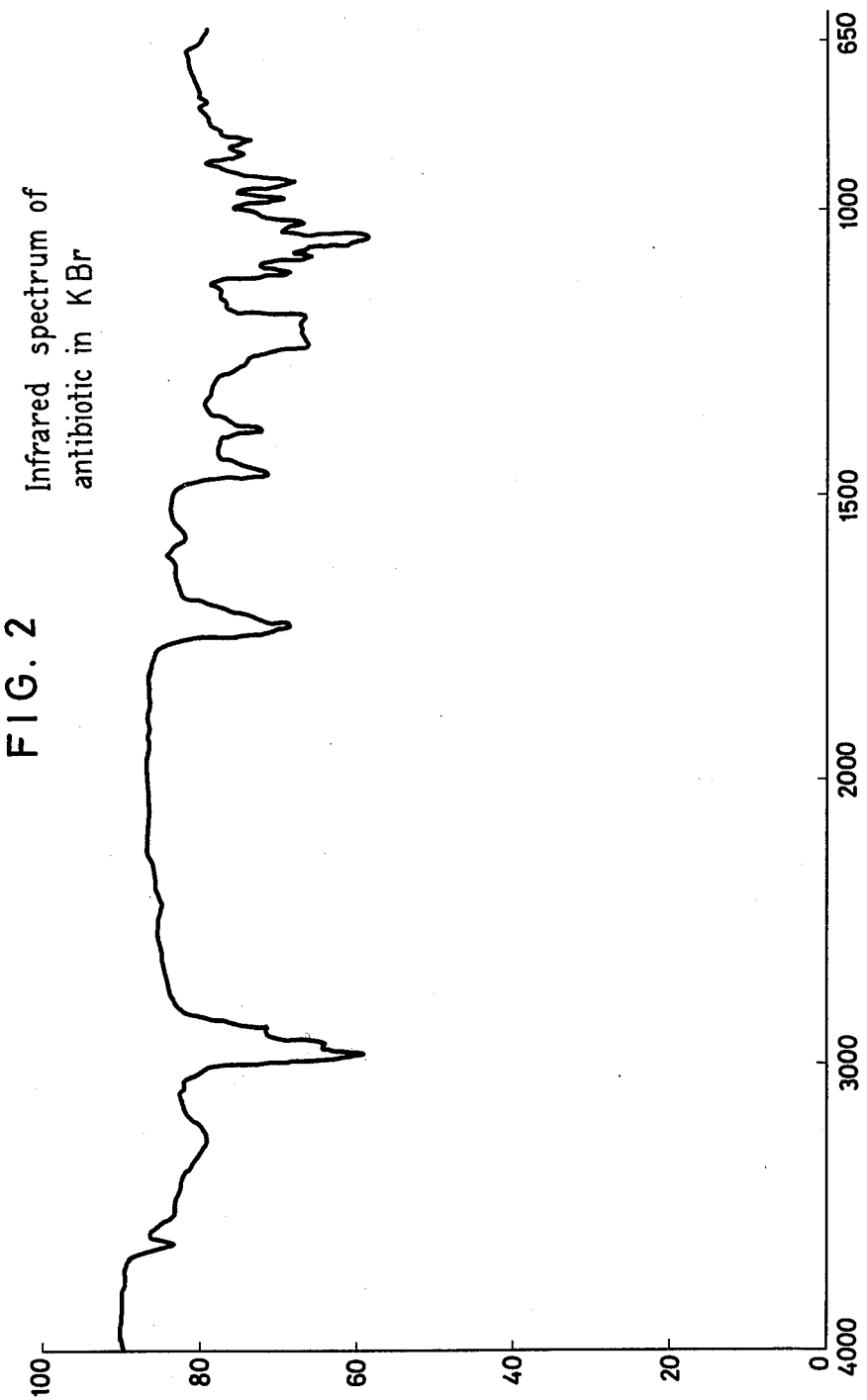

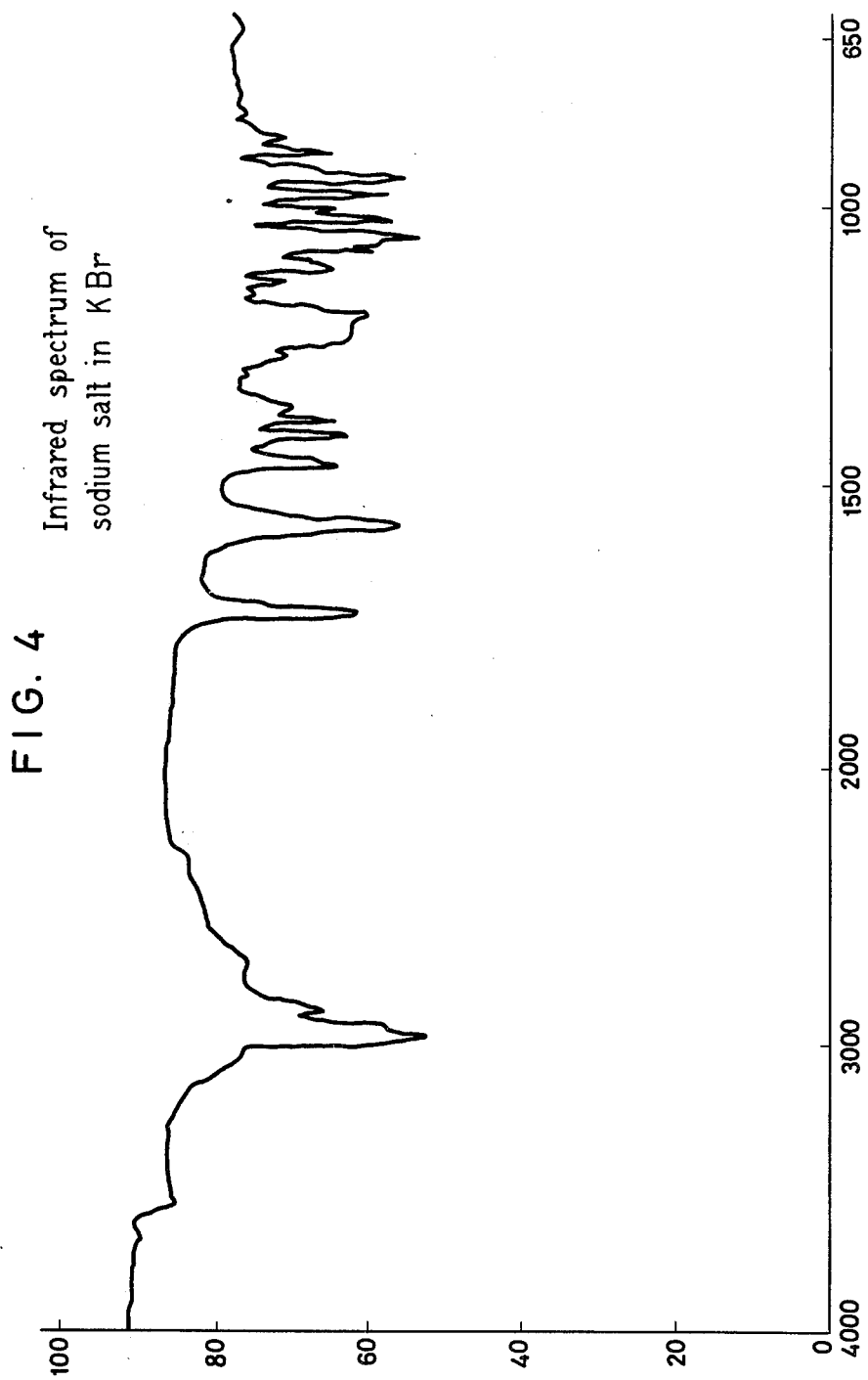

ANTIBIOTIC TS-0822

BACKGROUND OF THE INVENTION

1. Field of the Invention

This invention is in the field of compositions for controlling coccidiomycosis.

2. Description Of The Prior Art

Coccidiomycosis is an infectious disease which is induced in a domestic animal by a parasite belonging to Coccidia of Sporozoa causing diarrhea, malnutrition and ultimately causing death. In countries such as Japan, this disease occurs frequently in chickens and other barnyard animals. Under present conditions, such domestic animals are bred in limited space. Accordingly, infectious diseases such as coccidiomycosis must be carefully avoided.

A number of prophylactic and therapeutic agents have been proposed heretofore in the treatment of this disease. Materials such as arsenic, nitrofurazone, bisphenol, sulfamine agents, thiamine, quinoline derivatives and the like have been used in attempting to control this condition. The efficacies of these drugs are, however, insufficient, so that they have not been used widely for a long period of time because of the occurrence of coccidium resistant to these drugs.

SUMMARY OF THE INVENTION

The present invention is concerned with the use of the antibiotic number TS-0822 which is produced by strains belonging to Streptomyces in the treatment and/or prevention of coccidiomycosis.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 2 illustrates the infrared spectrum of the same material;

FIG. 4 illustrates the infrared spectrum of the sodium salt.

DESCRIPTION OF THE PREFERRED EMBODIMENTS

Figure 1:
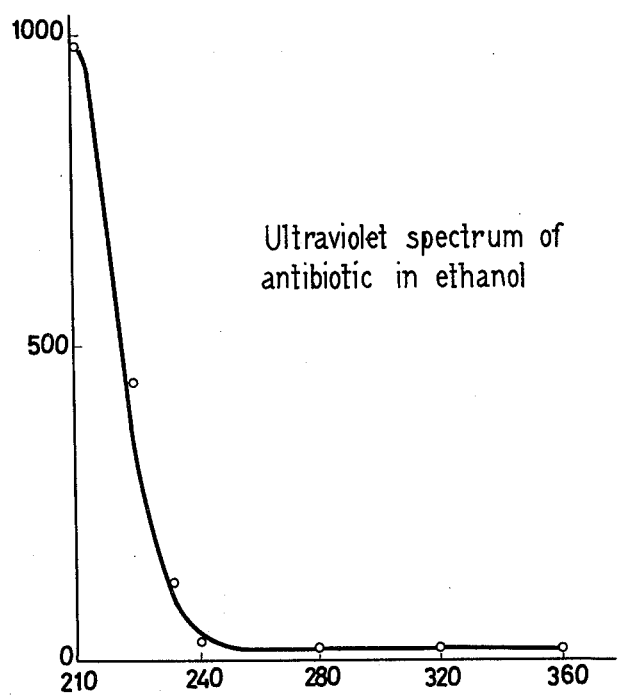
FIG. 1 illustrates the ultraviolet spectra of the antibiotic No. TS-0822.

The strain producing the antibiotic No. TS-0822 has the following bacteriological characteristics. The properties in the media were observed when cultured at 28° C for 2 weeks by the usual methods, unless otherwise specified.

1. Morphological Features

Aerial mycelia of this bacterial strain growth in any media are not very plentiful. Conidium formation is rarely the case. Insertion of aerial mycelia in synthetic media is fairly good. Aerial mycelia of this bacterial strain growth in starch-inorganic salts media have not so many ramifications, and these linear form the verticillate. The spores are not abundantly observed and only about 5 to 15 spores exist on the pointed head. The chain of conidium assumes the form of a wave, a portion of which takes the form of a loop. These form a bunchy branch known as a cluster. The conidium is elliptical in shape and measures about 1.6 microns in one dimension and 2 to 2.3 microns in the other. According to electron microscopy studies the conidium is smooth

2. Growth Characteristics of the Bacteria in Various Media

The following characteristics were observed in the media indicated.

A. Sucrose - Czapek's agar
  Growth (G): poor and colorless; penetrates into agar
  Aerial mycelium (AM): none or very slight; white
  Soluble pigment (SP): none B. Glucose - asparagine agar
  G: fairly good, cream colored, gradually changes to yellow
  AM: slight, covering the surface thinly, white to pale yellowish gray
  SP: none C. Gylcerine - asparagine agar
  G: moderate, white to cream colored, lustrous, penetrates into agar
  AM: white, gradually changes to pink
  SP: none D. Calcium malate agar
  G: poor, white to cream colored
  AM: poor, white
  SP: none E. Starch - inorganic salt medium
  G: moderate, white gradually changes to cream colored, finally to yellow, penetrates into agar
  AM: white, cottony
  SP: none F. Normal agar
  G: moderate, yellow
  AM: poor, powdery white
  SP: none G. Glucose nutrient agar
  G: good, lustrous, changes from cream colored to brownish yellow
  AM: poor, cover the surface thinly, white to gray
  SP: dark brown H. Tyrosine agar
  G: moderate, yellow, penetrates into agar
  AM: none
  SP: none I. Oatmeal agar
  G: poor, flat, lustrous white to cream colored, penetrates into agar
  SM: none
  SP: none J. Gelatin medium
  G: moderate, brown
  AM: covers the surface thinly, olive-gray
  SP: light brown K. Potato slice
  G: good, brownish yellow, wrinkled
  AM: formed only at the upper surface, white to bright gray
  SP: none L. Bennett's agar
  G: moderate, lustrous yellowish brown
  AM: cover the surface thinly, gray
  SP: pale brown M. Yeast extract - malt extract agar
  G: good, rising, cream colored to brown
  AM: poor, brownish white
  SP: pale brown N. Ferrous peptone broth
  G: moderate, changes from yellow to dark yellowish green
  AM: none
  SP: none
O. Melanin forming agar
  G: flat, brown, penetrates into agar
  AM: gray
  SP: dark brown
P. Peptone nitrate broth
  G: on the bottom, cottony
  AM: none
  SP: brown
Q. Skim milk
  G: good, yellow, ring formed on surface
  AM: poor, white to brownish white
  SP: yellowish brown 3. Physiological Properties The organism is aerobic and grows over a pH range of about 4.5 to 9, showing particularly good growth over a pH range of 5.0 to 8.0. The organism can be grown at temperatures in the range of 15° to 40° C, exhibiting maximum growth at 26° to 29° C.

The organism exhibits the following properties:

| | |
|---|---|
| Formation of melanin: | positive |
| Production of hydrogen sulfide: | positive |
| Hydrolysis of starch: | positive |
| Coagulation of milk: | positive |
| Formation of tyrosinase: | negative |
| Nitrate reduction: | negative |
| Liquefication of gelatin: | negative |

This bacterial strain utilizes glucose and fructose well, slightly utilizes inoositol and xylose, and does not utilize arabinose, mannitol, raffinose, rhamnose or sucrose sodium citrate as the carbon source, as tested by Pridham & Gottlieg's method (J. Bact. Vol. 56, 107, 1948).

When this bacterial strain is checked with the Actinomycetes, Vol. 2, 1961 (S.A. Waksman) in view of its bacteriological properties and confirmed, it is evident that it belongs to Series Reticuli, particularly similar to *Streptomyces eurocidicus* because the bacteria forms a vertical file and produces melanine. However, it is differentiated from *Streptomyces eurocidicus* in that:

a. the new strain produces a yellowish brown soluble pigment and coagulates milk, whereas *Streptomyces eurodicicus* does not do either and b. the new strain only slightly utilizes arabinose, rhamnose and sucrose, whereas *Streptomyces eurocidicus* utilizes all three.

This strain has been referred to as a variable strain belonging to *Streptomyces eurocidicus* and is designated *Streptomyces eurocidicus* var. *asterocidicus*. This strain has been deposited with the Antibiotic Industrial Techniques Laboratory of the Japanese Academy of Industrial Techniques, located at No. 8-1, Inage 5chome, Chiba-shi, Chiba-ken, Japan and has been given Acceptance No. 2477. This strain has also been deposited with the American Type Culture Collection in the United States, and has been given ATCC Acceptance No. 31175.

In order to obtain the new antibiotic No. TS-0822, the aforementioned strain is inoculated on a nutrient-containing medium and aerobically cultured. This strain is properly used by itself or, in the form of variants obtained by the action of ultraviolet rays, X-rays, gamma rays or nitrogen mustard, or naturally occurring variants.

Both synthetic and natural media can be used in the present invention provided they contain the proper trace nutrients which are required by the strain. Suitable nutrients include carbon sources such as glycerine, glucose and the like; nitrogen sources such as peptone, protein degradation products, meat extract, soybean powder, various ammonium salts and the like; and inorganic salts such as sodium chloride, calcium chloride, calcium carbonate, and other trace heavy metallic salts such as iron, copper and magnesium. Both liquid and solid media can be used, and when the formed is employed, cultivation is conducted with aeration or shaking. Cultivation of the bacteria is preferably conducted over a pH range from 6 to 9 and at temperatures of from 25° to 35° C, particularly at 27° to 28° C. After cultivation for 3 to 5 days, production of the antibiotic reaches a maximum.

After cultivation, the broth is filtered and subjected to the usual preparation methods such as centrifugation to separate the broth into liquid and solid phases containing the organism. The antibiotic No. TS-0822 is contained chiefly in the thus obtained liquid phase.

The activity of the antibiotic No. TS-0822 in the obtained cultured broth can be measured as anti-mycoplasma activity against *Mycoplasma laidlawii*, one species of Mycoplasma. In this test, the pulp disc is immersed into the culture filtrate and the disc is then coated on an agar plate containing the bacteria to be tested. The cultivation is carried on at 37° C for 20 to 24 hours after diffusion at 4° C for 30 minutes. The activity can be estimated from the size of the growth inhibition ring formed around the pulp disc.

In order to obtain the antibiotic No. TS-0822, the culture liquid or filtrate thereof is adjusted to an acidic pH, for example, 3 to 4. Thereafter, the culture filtrate is extracted with organic solvents such as ethyl acetate, amyl acetate, chloroform, dichloromethane or alcohol, for example, butanol, or with mixed solvents. Isolation can also be conducted by adsorption methods, using activated charcoal or synthetic adsorbents, such as "Amberlite XAD" or the like.

The thus obtained crude concentrated oily substance containing the antibiotic is purified by column chromatography over a silica gel or other adsorbent, or by gel filtration using "Sephadex LH-20" or the like, and the resulting purified substance is finally crystallized from organic solvents such as a mixture of ethyl acetate and petroleum ether or the like to produce columnar crystals.

The antibiotic thus obtained is characterized as a monocarboxylic acid from which sodium and potassium salts can be formed. For example, an ethanol solution containing the antibiotic is adjusted to a pH in excess of 8 by adding basic compounds such as sodium bicarbonate or sodium hydroxide, and crystallization is performed from this solvent system to yield the sodium salt of the antibiotic as colorless columnar crystals. The sodium salt can be readily converted back to the free form.

The antibiotic No. TS-0822 has the following properties.

1. Physico-chemical Properties

The antibiotic No. TS-0822 and its sodium salt are colorless, columnar crystals which are soluble in benzene, ethyl acetate, chloroform, dichloromethane, acetone, n-butanol, ethanol, methanol, dimethyl sulfoxide and pyridine. They are insoluble or only slightly soluble in water, Tollens' reagent, Molisch reagent, ferric chloride, Liebermann's reagent, and ninhydrin. The Fehling and Ehrlich reactions of the antibiotic are negative and the ferric hydroxamate reaction is positive. The antibiotic exhibits no decrease in activity in a mixed solvent of dimethyl sulfoxide and water at a pH of 2 at 37° C for 15 hours, and at the same pH at 60° C for 30 minutes. The activity, however, decreases to about half at a pH of 9 at 4° C for 15 hours and at the same pH at 60° C for 30 minutes.

Elemental analysis of this antibiotic affords the following results:

C: 60.12%, H: 8.94%, N: 0%

The molecular weight was calculated to be about 720.

The melting point of the antibiotic is from 151 to 153° C and the specific rotation is $[\alpha]_D^{15} + 51.3°$, (C=0.07, CHCl$_3$)

The melting point of the sodium salt is 277° to 279° C with decomposition. Its specific rotation is $[\alpha]_D^{15} + 78.9°$, (C=0.08, CHCl$_3$)

Figure 3:
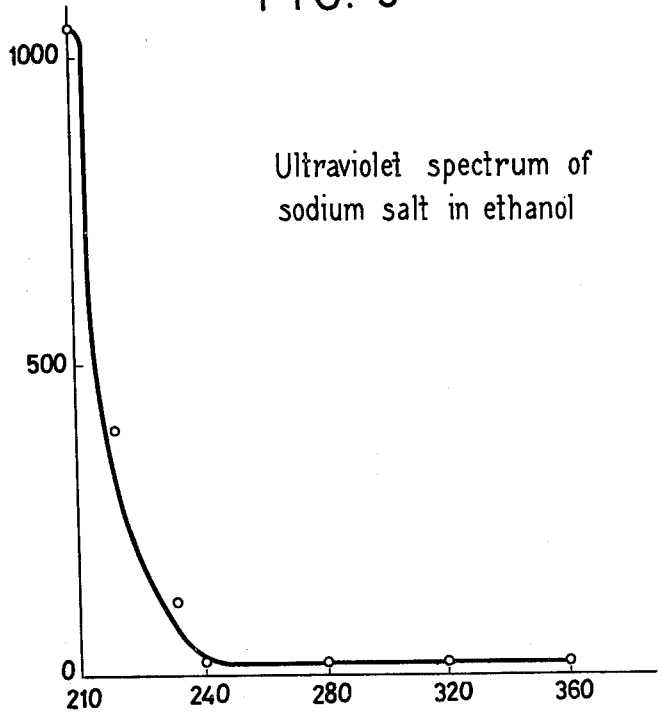
FIG. 3 illustrates the ultraviolet and visible spectra of the sodium salt of the antibiotic No. TS0822.

The ultraviolet and visible spectra of the antibiotic as shown in FIG. 1, and its sodium salt as shown in FIG. 3, exhibit no maxima.

The infrared absorption spectra of the antibiotic, as shown in FIG. 2, shows main absorption bands at 3500, 2950, 1730, 1460, 1380, 1200 and 1050cm$^{-1}$.

The infrared absorption spectrum of the sodium salt of the antibiotic, as shown in FIG. 4, exhibits main absorption bands at 3500, 2950, 1724, 1570, 1460, 1405, 1380, 1200, and 1050cm$^{-1}$.

2. Biological Properties

A. Toxicity

The acute toxicity of the antibiotic No. TS-0822 in mice, expressed as LD$_{50}$ is 5 mg./kg (intraperitoneal), 1.0 mg/kg (intraveneous) and 2.5 mg/kg (subcutaneous). The acute toxicity of the sodium salt of the antibiotic is similar to that of the free form.

The antibiotic No. TS-0822, prepared as described above may be used alone or in combination with feed, according to species, conditions of illness, and the age of the domestic animals.

The antibiotic may be administered in the form of a powder, granules, tablets, capsules, oils, solution, emulsion or suspension, or the organism containing TS-0822 or its ferment culture can also be administered. In such administration, materials may be diluted. The diluents are preferably materials which constitute a part of the feed. Thus, suitable diluents include barley, powder, wheat flour, rye powder, corn powder, soybean powder, soybean lees, seed oil, chaff, rice bran, exoleated bran, sugar cane, bean curds, starches, cellulose, lactose, sucrose, glucose, fructose, yeast, spent yeast, residual organisms, fish meal or ferment residues.

The antibiotic of the present invention may be used in combination with well known feed additives such as various vitamins, minerals, antiseptics, enzyme preparations, proteins, carbohydrates, amino acids, febrifuges, analgesics, antiphlogistics, bactericides, and the like.

The amount of antibiotic to be administered depends upon the species of the domestic animal, the administration methods, purposes, and the conditions of illness, but usually is in the range of about 0.005 to 0.1%. In the treatment of coccidiomycosis, the antibiotic mixed with feed can be used in an amount up to about 0.5% by weight.

Where the prophylactic and therapeutic agent of the present invention is used in combination with feeds and the like, it may be given in the form of the cultured organism of Streptomyces eurocidicus var. asterocidicus, purified extract from broth, highly concentrated bacteria containing the antibiotic, and dried matter obtained from the culture liquid. It is preferred, however, that the material is first diluted to 1 to 50% with suitable intermediate diluents prior to mixing with the feed and used in further diluted form according to the purposes intended.

A further understanding of the present invention can be obtained by reference to the following formulations and experimental results, which are provided for the purposes of illustration and are not intended to be construed as limiting.

EXAMPLE 1

Five hundred ml of seed culture medium consisting of 2% soybean flour, 2% starch, 0.25% sodium chloride and 0.2% calcium carbonate and having a pH of 7.2 was inoculated with the antibiotic No. TS-0822 previously grown on Krainsky's asparagine-glucose agar slants and cultured at 27° C for 20 hours with shaking. 17.5 ml of culture medium consisting of 2% glucose, 0.5% peptone, 0.5% sodium chloride, 0.25% calcium chloride and 0.1% sodium acetate having a pH of 7.2 was inoculated with 500 ml of the above cultured solution and cultured at 27° C for 72 hours with shaking. In the cultured solution, the antibiotic No. TS-0822 was present in an amount of 50 mcg/ml.

EXAMPLE 2

The cultured solution prepared as in Example 1 was adjusted to a pH of 3.0 with 3N hydrochloric acid. To this was added 1% "Celite 545" and the resulting mixture was filtered. The filtrate was saturated with sodium chloride and to the resulting mixture was added an equal amount of ethyl acetate. The resulting mixture was stirred and extracted for the antibiotic in the ethyl acetate layer. The thus obtained layer was concentrated under reduced pressure to give 2.35 grams of a brown crude oily substance. 2.35 grams of this substance were dissolved in 6 ml of 90% ethanol and the resulting solution was charged on a column of "Sephadex LH-20" (50 g, 2.5×30cm) previously treated with 90% ethanol. The active fractions which were eluted with ethanol were concentrated to dryness under reduced pressure to yield 0.5% of pale yellow oily substance.

EXAMPLE 3

0.57 g of the pale yellow oily substance obtained in Example 2 was dissolved in 0.5 ml of benzene and applied on a silica gel column (25 g, 1.2×20cm), previously treated with benzene. After washing the column with 50 ml of benzene, the active principle was eluted from the column with a mixture of benzene-ethyl acetate (5:2). This active fraction was then concentrated to dryness under reduced pressure and to this was added 0.3 ml of ethyl acetate. The resulting mixture was allowed to stand at 4° C to yield 0.14 g of colorless crude columnar crystals. These crystals were further dissolved in 0.2 ml of the mixed solvent of chloroform and ethyl acetate (1:9) and allowed to stand to yield 74.2 mg of the antibiotic No. TS-0822 as colorless columnar crystals.

EXAMPLE 4

20 mg of the antibiotic contained in Example 3 were dissolved in 2 ml of ethanol and the resulting solution was adjusted to a pH of 8.0 with N sodium hydroxide solution. The solution was allowed to stand at 4° C for 12 hours and water was added and the mixture was extracted with chloroform. The extract was crystallized from 1 ml of a mixed solvent of chloroform and ethyl acetate (1:9). Further recrystallization from ethyl acetate provided 12.5 mg of the sodium salt of the antibiotic as columnar crystals.

EXAMPLE 5

The effect of the antibiotic No. TS-0822 on coccidiomycosis was examined in male white leghorn chickens aged 9 days as follows: New born chickens immediately after incubation were bred while they were prevented from infection with coccidiomycosis until the starting day of the testing.

The antibiotic No. TS-0822 was separated, purified and obtained in a purity of 99.5%. This material was mixed with assorted feed for new born chickens containing no additional anti-coccidiomycosis agents, at ratios of 0.005 and 0.01%.

Chickens which were in normal health were divided into groups consisting of 10 animals each, with each group having nearly equal body weight. Of these, 2 groups were taken as a test group, and the other 2 groups were control groups. The control groups were an infected group and a non-infected control, respectively. To the test group was given the assorted feed containing the prescribed drug. The same feed for a new born chicken but containing no drugs was given to the control. After 24 hours from feeding, $5 \times 10^4$ oocysts of *Eimelia tenella* were given orally to each group exclusive of the noninfected control group. The variation of the body weight and the bloody excrements from the intestines of the chickens were observed every day prior to feeding, until the end of testing.

Chickens were submitted to dissection on the 7th day from their infection with the oocysts, and the lesions of the caecium were inspected. The results obtained are shown in the following table.

In the foregoing table, the rate of increase in body weight was determined as the quotient of the mean body weight at the end of the testing divided by the mean body weight of the start of testing. The ratio of rate of increase in body weight was determined as the ratio of the rate of increase in body weight at the end of the testing of each group compared to that of the non-infected group. The state of bleeding was expressed as the amount of bleeding from the intestines of the chickens reflected as the numbers of shots of blood. The results of dissection are expressed as the numbers of chickens having the following lesion characteristics:

| | |
|---|---|
| − | normal |
| + | slight |
| ++ | slight, but some lesions observed |
| +++ | moderate |
| ++++ | severe, lesions clearly observed |

The following examples provide specific formulations which can be used in accordance with the present invention:

| | |
|---|---|
| Powder: | |
| TS-0822 | 0.1 part by weight |
| Wheat flour | 99 parts by weight |
| Powder | |
| TS-0822 | 0.1 part by weight |
| Soybean powder | 90 parts by weight |
| Starch | 10 parts by weight |
| Powder: | |
| TS-0822 | 0.1 part by weight |
| Spent yeast | 80 parts by weight |
| Wheat flour | 20 parts by weight |
| Tablet: | |
| TS-0822 | 0.1 part by weight |
| Starch | 40 parts by weight |
| Sucrose | 40 parts by weight |
| Calcium carbonate | 20 parts by weight |
| Hydrated preparation: | |
| TS-0822 | 0.5 part by weight |
| Lactrose | 30 parts by weight |
| Sucrose | 60 parts by weight |
| Starch | 10 parts by weight |
| Vitamin $B_2$ | 1 part by weight |
| Granule: | |
| TS-0822 | 0.5 part by weight |
| Starch | 90 parts by weight |
| Cellulose | 10 parts by weight |
| Powder | |
| Organism containing TS-0822 | 10 parts by weight |
| Corn powder | 50 parts by weight |

TABLE 1

| | | Variation of body-weight | | State of bleeding | | | | | | | |
|---|---|---|---|---|---|---|---|---|---|---|---|
| | | The rate of the increase in body weight | The ratio of the rate of the increase in body weight | 5 days after | 6 days after | 7 days after | \multicolumn{5}{c}{Lesion of caecum} | | | |
| | | | | | | | − | + | ++ | +++ | ++++ |
| Test group | Added 0.05% of antibiotic No. TS-0822 | 1.45 | 1.05 | no | no | no | 7 | 2 | 1 | | |
| | Added 0.1% of antibiotic No. TS-0822 | 1.46 | 1.06 | no | no | no | 10 | | | | |
| Control group | Infected control | 1.09 | 0.79 | much | much | little | | | | | 10 |
| | non-infected control | 1.38 | 1.00 | no | no | no | 10 | | | | |

| | |
|---|---|
| -continued | |
| Wheat flour | 40 parts by weight |

It will be apparent to one of ordinary skill in the art that many changes and modifications can be made to the described invention without departing from the spirit or scope of the invention as described.

We claim as our invention:

1. The antibiotic TS-0822 in the form of colorless columnar crystals, the antibiotic in free form exhibiting main absorption bands in its infrared absorption spectrum as shown in FIG. 2, said antibiotic having an elemental analysis of about C:60.12%, H:8.94%, and N:0%, a molecular weight of about 720, a specific rotation of $[\alpha]_D^{15} + 51.3°$, (C = 0.07, $CHCl_3$), a melting point of from 151° to 153° C, an ultraviolet absorption spectrum substantially as shown in FIG. 1, and being soluble in benzene, ethyl acetate, chloroform, dichloromethane, acetone, n-butanol, ethanol, methanol, dimethyl sulfoxide, and pyridine and being insoluble or only slightly soluble in water, Tollens' reagent Molisch reagent, ferric chloride, Liebermann's reagent and ninhydrin.

2. The antibiotic of claim 1 in the form of its sodium salt.

3. The method of treating an animal for the control of the infectious disease coccidiomycosis which comprises administering to said animal an amount of the antibiotic TS-0822 as defined in claim 1, sufficient to control said disease.

4. The method of claim 3 in which said antibiotic is combined with a pharmacologically acceptable diluent.

5. The method of claim 4 in which said diluent is a cereal powder.

6. The method of claim 4 in which said diluent is a sugar.

7. The method of claim 4 in which said diluent is yeast.

8. A composition for the treatment of coccidiomycosis comprising a mixture of the antibiotic TS-0822 as defined in claim 1 and a pharmacologically acceptable diluent, said mixture containing between 0.005 and 0.5% by weight of said antibiotic.

9. The composition of claim 8 in which said diluent is a cereal powder.

10. The composition of claim 8 in which said diluent is a sugar.

11. The composition of claim 8 in which said diluent is yeast.

* * * * *